(12) United States Patent
Spooner et al.

(10) Patent No.: US 10,339,570 B2
(45) Date of Patent: Jul. 2, 2019

(54) CUSTOMIZED BILLBOARD WEBSITE ADVERTISEMENTS

(75) Inventors: Elaine M. Spooner, Winnetka, CA (US); John D. Koscheka, Los Angeles, CA (US); Michael S. Bessolo, Glendale, CA (US); Mark L. Simpson, Monterey Park, CA (US); Jean L. Yuan, Manhattan Beach, CA (US); J. Craig D. Russell, Playa Vista, CA (US); Christopher M. Bettes, Los Angeles, CA (US); Greg McCarthy, Santa Monica, CA (US)

(73) Assignee: FOX ENTERTAINMENT GROUP, INC., Los Angeles, CA (US)

( * ) Notice: Subject to any disclaimer, the term of this patent is extended or adjusted under 35 U.S.C. 154(b) by 1004 days.

(21) Appl. No.: 13/090,997

(22) Filed: Apr. 20, 2011

(65) Prior Publication Data

US 2012/0101904 A1      Apr. 26, 2012

Related U.S. Application Data

(60) Provisional application No. 61/326,544, filed on Apr. 21, 2010.

(51) Int. Cl.
*G06Q 30/02* (2012.01)

(52) U.S. Cl.
CPC ..... *G06Q 30/0277* (2013.01); *G06Q 30/0269* (2013.01); *G06Q 30/0271* (2013.01); *G06Q 30/0276* (2013.01)

(58) Field of Classification Search
None
See application file for complete search history.

(56) References Cited

U.S. PATENT DOCUMENTS

| | | | |
|---|---|---|---|
| 5,732,184 A | 5/1998 | Chao et al. |
| 6,950,825 B2 | 9/2005 | Chang et al. |
| 7,103,374 B2 | 9/2006 | Yla-Jaaski et al. |
| 7,110,984 B1 | 9/2006 | Spagna et al. |
| 7,280,529 B1 | 10/2007 | Black et al. |

(Continued)

FOREIGN PATENT DOCUMENTS

| | | |
|---|---|---|
| CN | 101091217 | 9/2006 |
| JP | 2003-153152 | 5/2003 |

(Continued)

OTHER PUBLICATIONS

Interactive 3-DTV—Concepts and Key Technologies, Fehn et al., Proceedings of the IEEE, vol. 94, No. 3, Mar. 2006.*

(Continued)

*Primary Examiner* — David J Stoltenberg
(74) *Attorney, Agent, or Firm* — Gates & Cooper LLP (57) ABSTRACT

A method, apparatus, system, and computer program product provide the ability to deliver an advertisement. Customization attributes for displaying billboard advertisements are defined. Each billboard advertisement comprises an advertisement for media content. A user requests access to a website and the server computer transmits the website that includes or provides access to the advertisements. Based on the customization attributes, a first billboard advertisement is primarily displayed without occlusion and remaining billboard advertisements are displayed partially occluded by the first billboard advertisement.

27 Claims, 10 Drawing Sheets

(56) References Cited

U.S. PATENT DOCUMENTS

| | | |
|---|---|---|
| 7,336,646 B2 | 2/2008 | Muller |
| 7,376,338 B2 | 5/2008 | Kim et al. |
| 7,613,704 B2 | 11/2009 | Lobo |
| 8,208,788 B2 | 6/2012 | Ando et al. |
| 8,312,552 B1 | 11/2012 | Hadden et al. |
| 2002/0010759 A1 | 1/2002 | Hitson et al. |
| 2002/0031262 A1 | 3/2002 | Imagawa et al. |
| 2002/0138844 A1 | 9/2002 | Otenasek et al. |
| 2003/0001880 A1 | 1/2003 | Holtz et al. |
| 2003/0028889 A1 | 2/2003 | McCoskey et al. |
| 2003/0164844 A1 | 9/2003 | Kravitz et al. |
| 2005/0278729 A1 | 12/2005 | Lmakin et al. |
| 2006/0021057 A1 | 1/2006 | Risan et al. |
| 2006/0089912 A1 | 4/2006 | Spagna et al. |
| 2006/0195909 A1 | 8/2006 | Boswell et al. |
| 2006/0259434 A1 | 11/2006 | Vilcauskas et al. |
| 2007/0038567 A1 | 2/2007 | Allaire et al. |
| 2007/0050467 A1 | 3/2007 | Borrett et al. |
| 2007/0073626 A1 | 3/2007 | Reeder et al. |
| 2007/0079224 A1 | 4/2007 | Limberg |
| 2007/0206799 A1 | 9/2007 | Wingert et al. |
| 2007/0250761 A1 | 10/2007 | Bradley et al. |
| 2008/0010648 A1 | 1/2008 | Ando et al. |
| 2008/0077492 A1* | 3/2008 | Ho et al. .......................... 705/14 |
| 2008/0112440 A1 | 5/2008 | Bedekar et al. |
| 2008/0120324 A1* | 5/2008 | Davis ........................... 707/102 |
| 2008/0140481 A1* | 6/2008 | Gold ...................... G06Q 30/02 705/7.29 |
| 2008/0163379 A1* | 7/2008 | Robinson ............ G06F 3/04815 726/27 |
| 2008/0170622 A1 | 7/2008 | Gordon et al. |
| 2008/0208692 A1* | 8/2008 | Garaventi ............ G06Q 20/102 705/14.69 |
| 2008/0228578 A1 | 9/2008 | Mashinsky |
| 2008/0301058 A1 | 12/2008 | Campbell et al. |
| 2008/0307310 A1 | 12/2008 | Segal et al. |
| 2008/0307343 A1* | 12/2008 | Robert et al. .................. 715/765 |
| 2009/0012935 A1 | 1/2009 | Beged-Dov et al. |
| 2009/0025085 A1 | 1/2009 | Kim et al. |
| 2009/0076887 A1* | 3/2009 | Spivack ................. G06Q 30/02 705/14.69 |
| 2009/0122978 A1 | 5/2009 | Gorissen et al. |
| 2009/0144140 A1* | 6/2009 | Willis ..................... A63F 13/12 705/14.12 |
| 2009/0144157 A1* | 6/2009 | Saracino et al. ................. 705/14 |
| 2009/0150797 A1 | 6/2009 | Burkholder et al. |
| 2009/0165080 A1 | 6/2009 | Fahn et al. |
| 2009/0225910 A1 | 9/2009 | Suzuki et al. |
| 2009/0259941 A1* | 10/2009 | Kennedy, Jr. .......... G06Q 30/02 715/719 |
| 2009/0281889 A1* | 11/2009 | Derosa-Grund ....... G06Q 30/00 705/14.25 |
| 2009/0327079 A1 | 12/2009 | Parker et al. |
| 2010/0107258 A1 | 4/2010 | Park et al. |
| 2010/0114642 A1 | 5/2010 | Dufosse et al. |
| 2010/0131385 A1* | 5/2010 | Harrang et al. ................. 705/26 |
| 2010/0189265 A1 | 7/2010 | Ito et al. |
| 2010/0198697 A1* | 8/2010 | Brown .................. G06Q 30/02 705/14.73 |
| 2010/0205261 A1* | 8/2010 | Michel .......................... 709/206 |
| 2011/0061108 A1 | 3/2011 | Arrasvuori et al. |
| 2011/0166918 A1 | 7/2011 | Allaire et al. |
| 2011/0167499 A1 | 7/2011 | Strom et al. |
| 2011/0173054 A1* | 7/2011 | Kutaragi ................ G06Q 30/02 705/14.5 |
| 2011/0306027 A1 | 12/2011 | Bridges et al. |
| 2013/0097302 A9 | 4/2013 | Khedouri et al. |

FOREIGN PATENT DOCUMENTS

| | | |
|---|---|---|
| JP | 2003330840 | 11/2003 |
| JP | 2004-229231 | 8/2004 |
| JP | 2007013909 | 1/2007 |
| JP | 2007-528630 | 10/2007 |
| JP | 2008125102 | 5/2008 |
| JP | 2008-283489 | 11/2008 |
| JP | 2008278121 | 11/2008 |
| JP | 2009-501491 | 1/2009 |
| JP | 2009217332 | 9/2009 |
| JP | 2000-083192 | 2/2015 |
| JP | 2008-085888 | 2/2015 |
| KR | 10-0722992 | 5/2007 |
| KR | 10-2009-0097750 | 9/2009 |
| WO | 2007/011537 | 1/2007 |
| WO | 2009/073583 | 6/2009 |
| WO | 2011/060439 | 5/2011 |
| WO | 2011/109523 | 9/2011 |
| WO | 2011/109527 | 9/2011 |
| WO | 2009/016998 | 3/2012 |
| WO | 2012/030965 | 3/2012 |

OTHER PUBLICATIONS www.enensys.com: "Technical Overview of Single Frequency Network". Enensys Technologies, 7 pages.
International Search Report for PCT Application No. PCT/US2011/049971 filed on Aug. 31, 2011.
Restriction Requirement dated Dec. 10, 2012 for U.S. Appl. No. 13/090,993.
Response to Restriction Requirement filed Jan. 10, 2013 for U.S. Appl. No. 13/090,993.
Office Action dated Feb. 13, 2013 for U.S. Appl. No. 13/090,993.
Restriction Requirement dated Nov. 8, 2012 for U.S. Appl. No. 13/091,005.
Response to Restriction Requirement filed Dec. 11, 2012 for U.S. Appl. No. 13/091,005.
Office Action dated Jan. 14, 2013 for U.S. Appl. No. 13/091,005.
White, R. et al., "How Computers Work (7th Edition)", QUE, Oct. 2003.

\* cited by examiner

Spotlights Add/Edit

| | |
|---|---|
| Name* | Billboards for Logged In Customers |
| Template | Default FoxFast Template (April30) ▼ |
| Description | Default Academy Awards billboard + Customer-Specific billboards |
| Status | Active ▼ |
| Auto Close | ☑ |
| Created On | 14-Apr-2010 |
| Created By | Greg McCarthy(greg.mccarthy@fox.com) |
| Modified On | 14-Apr-2010 |
| Modified By | Greg McCarthy(greg.mccarthy@fox.com) |

[Save] [Reset] [Cancel]

Billboards

[Delete] [Assign Billboards]

| | Name | Type | Effective Date | Expiration Date | Status | Sort Order▲ | Display Time | Parameters |
|---|---|---|---|---|---|---|---|---|
| ☐ | Academy Award Billboard | Public | | | Publish | 1 | 2 | |
| ☐ | Billboard A - for 4567 Viasat Hungary | Restricted | | | Publish | 20 | 3 | |
| ☐ | Billboard B - for 4567 Viasat Hungary | Restricted | | | Publish | 30 | 5 | |
| ☐ | Billboard C - for 4567 Viasat Hungary | Restricted | | | Publish | 40 | 2 | |
| ☐ | Billboard K - for 5205 Canal Plus | Restricted | | | Publish | 200 | 2 | |
| ☐ | Billboard Y - for 5205 Canal Plus | Restricted | | | Publish | 300 | 2 | |

FIG. 5

| Category Add/Edit | | | |
|---|---|---|---|
| Name* | MIP/Unscripted | Sort Order: | 16 |
| Spotlight: | Animated Billboards-Lo ▽ | Status: | Active ▽ |
| FoxFast Sort Order: | A-Z ▽ | | |
| Save Reset Cancel | | | |

Groups: Clear Select Groups

| | Name | Type |
|---|---|---|
| ☐ | MIPTV 2010 Booth | Group |

⎫ 602

⎫ 606

Titles: Clear Select Groups

| | Title Id | Title | Product Type | Release Year |
|---|---|---|---|---|
| ☐ | FVAN00 | REAL WEDDING CRASHERS, THE-FORMAT | UNSCRIPTED FORMATS | |
| ☐ | HAD097 | TEMPTATION ISLAND FORMAT | UNSCRIPTED FORMATS | |
| ☐ | HAH097 | TEST, THE-FORMAT | UNSCRIPTED FORMATS | |
| ☐ | HAI097 | CHALLENGE OF THE CHILD GENIUS-FORMAT-(DO NOT USE -SEE YMC097) | UNSCRIPTED FORMATS | |
| ☐ | HAN097 | SURPRISE WEDDING -FORMAT - (DO NOT USE - SEE YML097) | UNSCRIPTED FORMATS | |

Category Add/Edit

Name*: IPJ Fall 2009     Sort Order: 105
Spotlight: IPJ 2009 — FALL ▷     Status: Inactive ▷
FoxFast Sort Order: --Select-- ▷
Save | Reset | Cancel

Groups: ◯Clear ⦿Select Groups

| | Name | Type |
|---|---|---|
| ☐ | IPJ Fall 2009 | Group |
| ☐ | TVD Marketing | Group |

} 602

Titles: ◯Clear ⦿Select Groups

| | Title Id | Title | Product Type | Release Year |
|---|---|---|---|---|
| ☐ | 1APS00 | CLEVELAND SHOW, THE - 01 | SEASON | 2009 |
| ☐ | 1ARG00 | MODERN FAMILY - 01 | SEASON | 2009 |
| ☐ | 2APK00 | DOLLHOUSE - 02 | SEASON | 2009 |
| ☐ | 2APW00 | LIE TO ME - 02 | SEASON | 2009 |
| ☐ | 5AJN00 | AMERICAN DAD - 06 | SEASON | 2009 |

And You Can Vote To Pick The Movie!

Vote today for your 3 all-time favorite Fox films from the selections below.

The top 3 voted films will be screened at the Los Angeles Screening / Twentieth Century Fox 75th Anniversary Celebration Party!

| | First Choice | Second Choice | Third Choice |
|---|---|---|---|
| Die Hard | ○ | ○ | ○ |
| Alien | ○ | ○ | ○ |
| Home Alone | ○ | ○ | ○ |
| All About Eve | ○ | ○ | ○ |
| The Seven-Year Itch | ○ | ○ | ○ |
| M*A*S*H | ○ | ○ | ○ |
| Patton | ○ | ○ | ○ |
| The Rocky Horror Picture Show | ○ | ○ | ○ |
| True Lies | ○ | ○ | ○ |
| The French Connection | ○ | ○ | ○ |
| Butch Cassidy & the Sundance Kid | ○ | ○ | ○ |
| Young Frankenstein | ○ | ○ | ○ |
| Cleopatra | ○ | ○ | ○ |
| Mrs. Doubtfire | ○ | ○ | ○ |
| The Sound of Music | ○ | ○ | ○ |

CUSTOMIZED BILLBOARD WEBSITE ADVERTISEMENTS

CROSS-REFERENCE TO RELATED APPLICATIONS

This application claims the benefit under 35 U.S.C. Section 119(e) of the following commonly-assigned U.S. provisional patent application(s), which is/are incorporated by reference herein:

U.S. Provisional Patent Application Ser. No. 61/326,544 filed on Apr. 21, 2010, entitled "CUSTOMIZED BILLBOARD WEBSITE ADVERTISEMENTS", by ELAINE M. SPOONER, JOHN D. KOSCHEKA, MICHAEL S. BESSOLO, MARK L. SIMPSON, JEAN L. YUAN, J. CRAIG D. RUSSELL, CHRISTOPHER M. BETTES, and GREG MCCARTHY.

This application is related to the following co-pending and commonly-assigned patent application, which applications are incorporated by reference herein:

U.S. patent application Ser. No. 13/090,993, filed on Apr. 20, 2011, entitled "DIGITAL DELIVERY SYSTEM AND USER INTERFACE FOR ENABLING THE DIGITAL DELIVERY OF MEDIA CONTENT" by ELAINE M. SPOONER, JOHN D. KOSCHEKA, MICHAEL S. BESSOLO, MARK L. SIMPSON, JEAN L. YUAN, J. CRAIG D. RUSSELL, CHRISTOPHER M. BETTES, GREG MCCARTHY, SRINIVAS KUNDULA, and VENKATA NAGARAJU MANTENA, which application claims priority to U.S. Provisional Patent Application Ser. No. 61/326,538, filed on Apr. 21, 2010, entitled "DIGITAL DELIVERY SYSTEM AND USER INTERFACE FOR ENABLING THE DIGITAL DELIVERY OF MEDIA CONTENT" by ELAINE M. SPOONER, JOHN D. KOSCHEKA, MICHAEL S. BESSOLO, MARK L. SIMPSON, JEAN L. YUAN, J. CRAIG D. RUSSELL, CHRISTOPHER M. BETTES, GREG MCCARTHY, SRINIVAS KUNDULA, and VENKATA NAGARAJU MANTENA;

U.S. patent application Ser. No. 13/091,005, filed Apr. 20, 2011, entitled "MEDIA ASSET/CONTENT SECURITY CONTROL AND MANAGEMENT SYSTEM", by ELAINE M. SPOONER, JOHN D. KOSCHEKA, MICHAEL S. BESSOLO, MARK L. SIMPSON, JEAN L. YUAN, J. CRAIG D. RUSSELL, CHRISTOPHER M. BETTES, GREG MCCARTHY, SRINIVAS KUNDULA, and VENKATA NAGARAJU MANTENA, which application claims priority to U.S. Provisional Patent Application Ser. No. 61/326,549 filed on Apr. 21, 2010, entitled "MEDIA ASSET/CONTENT SECURITY CONTROL AND MANAGEMENT SYSTEM", by ELAINE M. SPOONER, JOHN D. KOSCHEKA, MICHAEL S. BESSOLO, MARK L. SIMPSON, JEAN L. YUAN, J. CRAIG D. RUSSELL, CHRISTOPHER M. BETTES, GREG MCCARTHY, SRINIVAS KUNDULA, and VENKATA NAGARAJU MANTENA.

BACKGROUND OF THE INVENTION

1. Field of the Invention

The present invention relates generally to the delivery of media content, and in particular, to a method, apparatus, system, and article of manufacture for customized billboard advertisements as they would appear on a website in a media asset and content distribution system that provides individual level micro marketing using rights and sales contract management systems.

2. Description of the Related Art

With the exponentially increasing use of the Internet, websites have evolved and developed many different mechanisms to increase profit. One primary mechanism utilized is that of web based advertising. Web based advertising often involves the delivery of a web page that automatically retrieves an advertisement from an advertiser and displays the advertisement to the user. However, the issue arises as to which advertiser to use and which advertisement to display to a given user.

In addition to traditional web based advertising and marketing, many media studios (e.g., FOX™) maintain a vast library of content that can potentially be digitally delivered to a licensed customer. Such customers may utilize a website to efficiently enable the search and delivery of such content (see the related applications incorporated by reference above). It is desirable to advertise particular assets/content on the website and to customize such content. Prior art systems fail to provide the ability to customize advertisements and content based on various settings. To better understand the invention, a detailed description of media content and prior art delivery systems may be useful.

Many types and pieces of information or media content may be utilized as part of the broadcast, advertisement, and sale of such content. For example, content from a content provider (e.g., a studio such as FOX™) may include:

Over 2,500 Feature Films; over 14,000 Television Series, Seasons & Episodes; and over 1,000 Specials, Movies of the Week & MiniSeries;

Over 100,000 images: Production Stills, Logos, Artwork, Gallery & Episodic Photos;

Over 12,000 Scripts & over 10,000 Music Cue Sheets;

Over 7,300 trailers and other promotional videos;

Over 2,500 episodes for screening;

Over 9,300 broadcast quality files, representing over 700 episodes; and

Over 1,000 broadcast quality promotional videos (Television spots, etc.).

Prior art techniques used to fulfill its customer's requests for advertising and publicity materials required the physical distribution of such materials on physical paper—e.g., slides and transparencies, ad-slicks (camera-ready advertisements of varying sizes that are used in print media such as newspapers and magazines), scripts and music cue sheets. Slides would be duplicated at a photo lab & scripts would be photocopied. The materials would then be boxed up & shipped out to customers such as international broadcasters. These boxes would often get held up at customs, or the materials would be misplaced by the customer—adding to the expense of both time and money.

To overcome some of the prior art problems, websites have been developed where customers were able to download advertising & publicity materials (referred to as assets) needed whenever (and as often) as necessary. Instead of slides, customers downloaded JPGs; instead of paper scripts, downloadable PDFs were available. Written information like synopses, cast & crew biographies, awards, and press quotes were also available on such web sites (e.g., FOX-FAST™).

Security mechanisms may also exist on such prior art web sites. Such security mechanisms included password-protection that was tied into a studio's television distribution sales system so customers were only given access to materials for the television series & films that the customer currently licensed from the particular studio. However, such a limited system would not allow the customer to view all of the assets available for the customer to license. In this regard, a television distribution sales group is continuously selling titles from a studio's entire catalog, and since customers can only see titles they already licensed in prior art websites, the need for an overall comprehensive catalog site was desirable.

To overcome such problems, a non-password protected catalog website (e.g., FOXNOW™) was developed in the prior art to showcase all titles (e.g., features, television series, specials, movies of the week, mini series, etc.) available from a particular entity. Such a prior art website provided the ability to search assets using a variety of criteria including actor, award, box office, genre, and synopsis key words (e.g. all titles about 'baseball').

In addition to the above websites, a further website (e.g., FOXSCREENING™) was developed in the prior art to allow customers to screen television shows and movies without waiting for a digital video disc (DVD) (and saving the costs of burning and shipping such discs as well). Such screening was viewed as a desirable pre-sales tool. Digital rights management (DRM) was used in such prior art websites to protect the content from unauthorized viewing and piracy.

However, for a media content owner to efficiently and easily deliver pre-sales and sold content to a customer while allowing a customer to easily and efficiently browse all content and receive such content was not provided by the above prior art systems. Instead, customers were forced to utilize multiple websites for different purposes and media content owners did not have the flexibility to easily manage, sample, and deliver such content to both prospective and actual customers. In addition, prior art systems failed to provide the ability to digitally deliver broadcast quality digital files. Instead the prior art required the duplication of a tape and the shipping of the tape overseas.

Thus, the prior art had many problems and deficiencies including:
- massive distribution costs to create and ship tapes;
- recurring and substantial sunk costs caused by the cost to manage physical media;
- product that can leak to the internet prior to a local market telecast;
- content leaks that can impact the perceived value of a product;
- accelerated demand to ship, schedule, and broadcast programs internationally on the heels of U.S. broadcasts;
- greater attention to physically manage higher content volumes against increasingly intense deadlines based on the accelerated demand to air products; and
- lack of ability to customize advertising such content on a single website.

Accordingly, what is needed is an online digital delivery system using a singular comprehensive easy-to-use website that provides the capability to: advertise content in a customized manner; search a media content owner's film and television series catalog; access and download marketing and publicity assets; screen movies, episodes, and promotional videos; and deliver broadcast quality digital files. Thus, rather than duplicating a tape and shipping it overseas, it is desirable to provide a customer with the ability to download a file and ingest the file directly into existing broadcast server workflows. Further, it is desirable to quickly transition from physical tape delivery to digital delivery for both television series and feature films.

SUMMARY OF THE INVENTION

One or more embodiments of the invention provide for customized billboard website advertisements. The customization of the website billboards may be performed on a micro-marketing level based on a user's profile, licensed content, and/or other attributes. Furthermore, the billboard advertisements enable two-way communications between a customer/user and a website owner displaying the billboard advertisements.

BRIEF DESCRIPTION OF THE DRAWINGS

Referring now to the drawings in which like reference numbers represent corresponding parts throughout.

DETAILED DESCRIPTION OF THE PREFERRED EMBODIMENTS

In the following description, reference is made to the accompanying drawings which form a part hereof, and which is shown, by way of illustration, several embodiments of the present invention. It is understood that other embodiments may be utilized and structural changes may be made without departing from the scope of the present invention.

Overview

One or more embodiments of the invention overcome the problems of the prior art by providing a software application and/or website that delivers customized billboard advertisements to customers/users.

Hardware and Software Environment

Figure 1:
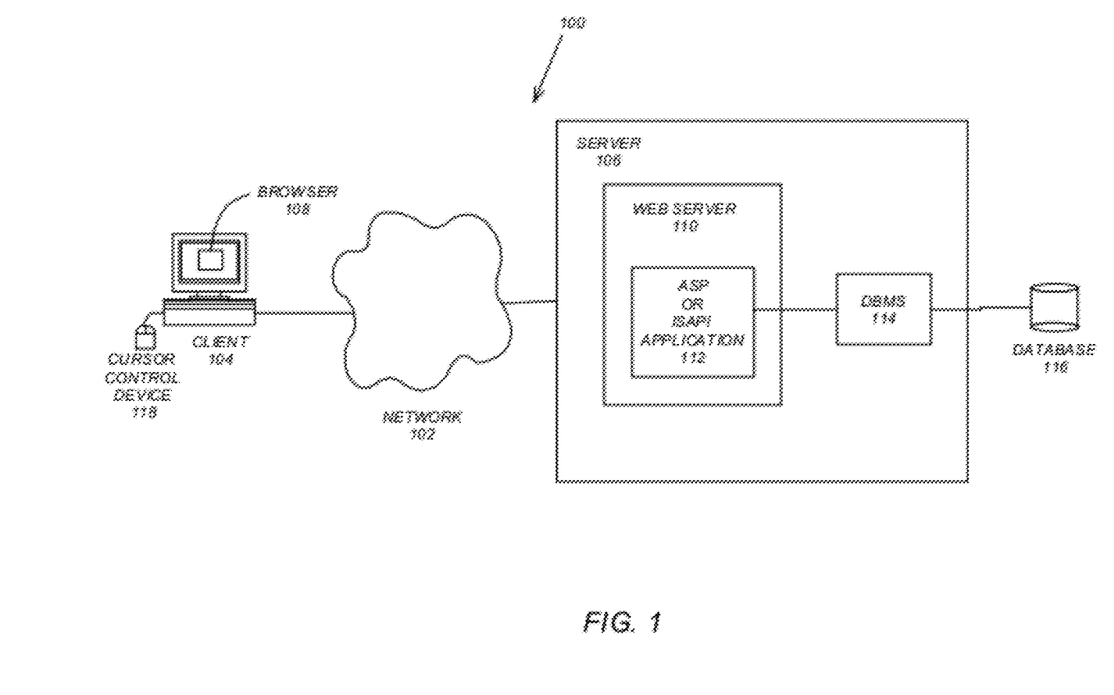
FIG. 1 schematically illustrates a hardware and software environment in accordance with one or more embodiments of the invention.

FIG. 1 schematically illustrates a hardware and software environment in accordance with one or more embodiments of the invention, and more particularly, illustrates a typical distributed computer system 100 using a network 102 to connect client computers 104 to server computers 106. A typical combination of resources may include a network 102 comprising the Internet, LANs (local area networks), WANs (wide area networks), SNA (systems network architecture) networks, or the like, clients 104 that are personal computers or workstations, and servers 106 that are personal computers, workstations, minicomputers, or mainframes. Additionally, both client 104 and server 106 may receive input (e.g., cursor location input) and display a cursor in response to an input device such as cursor control device 118.

A network 102 such as the Internet connects clients 104 to server computers 106. Network 102 may utilize ethernet, coaxial cable, wireless communications, radio frequency (RF), etc. to connect and provide the communication between clients 104 and servers 106. Clients 104 may execute a client application or web browser 108 and communicate with server computers 106 executing web servers 110. Such a web browser 108 is typically a program such as MICROSOFT INTERNET EXPLORER™, MOZILLA FIREFOX™, OPERA™, or APPLE SAFARI™. Further, the software executing on clients 104 may be downloaded from server computer 106 to client computers 104 and installed as a plug in or ACTIVEX™ control of a web browser. Accordingly, clients 104 may utilize ACTIVEX™ components/component object model (COM) or distributed COM (DCOM) components to provide a user interface on a display of client 104. The web server 110 is typically a program such as MICROSOFT'S INTERNET INFORMATION SERVER™.

Web server 110 may host an Active Server Page (ASP) or Internet Server Application Programming Interface (ISAPI) application 112, which may be executing scripts. The scripts invoke objects that execute business logic (referred to as business objects). The business objects then manipulate data in database 116 through a database management system (DBMS) 114. Alternatively, database 116 may be part of or connected directly to client 104 instead of communicating/obtaining the information from database 116 across network 102. When a developer encapsulates the business functionality into objects, the system may be referred to as a component object model (COM) system. Accordingly, the scripts executing on web server 110 (and/or application 112) invoke COM objects that implement the business logic. Further, server 106 may utilize MICROSOFT'S™ Transaction Server (MTS) to access required data stored in database 116 via an interface such as ADO (Active Data Objects), OLE DB (Object Linking and Embedding DataBase), or ODBC (Open DataBase Connectivity).

Generally, these components 108-118 all comprise logic and/or data that is embodied in/or retrievable from device, medium, signal, or carrier, e.g., a data storage device, a data communications device, a remote computer or device coupled to the computer via a network or via another data communications device, etc. Moreover, this logic and/or data, when read, executed, and/or interpreted, results in the steps necessary to implement and/or use the present invention being performed.

In one embodiment, instructions implementing the browser 108 or other applications for either client 104 or server 106 are tangibly embodied in a computer-readable medium, e.g., data storage device, which could include one or more fixed or removable data storage devices, such as a zip drive, floppy disc drive, hard drive, CD-ROM drive, tape drive, etc. Further, such applications are comprised of computer program instructions which, when accessed, read and executed by the client 104 or server 106 causes such computers 104-106 to perform the steps necessary to implement and/or use the present invention or to load the program of instructions into a memory, thus creating a special purpose data structure causing the computer to operate as a specially programmed computer executing the method steps described herein. Such applications may also be tangibly embodied in memory and/or data communications devices, thereby making a computer program product or article of manufacture according to the invention. As such, the terms "article of manufacture," "program storage device" and "computer program product" as used herein are intended to encompass a computer program accessible from any computer readable device or media.

Although the term "user computer", "client computer", and/or "server computer" is referred to herein, it is understood that such computers 104-106 may include portable devices such as cell phones, notebook computers, pocket computers, or any other device with suitable processing, communication, and input/output capability.

Of course, those skilled in the art will recognize that any combination of the above components, or any number of different components, peripherals, and other devices, may be used with computers 104-106.

Software Embodiments

Embodiments of the invention may provide for a website or application that provides the ability to deliver (e.g., download) media content via clients 104 and servers 106. As part of such a website/application, it is desirable to present and/or promote (e.g., spotlight) certain media content to customers. One or more embodiments of the invention enable such promotional activity via customized billboard advertisements. While non-client specific (non-customized) billboards are available to a non-logged in user, logging into a system that manages the advertising provides the ability to send client-specific customized billboards to that logged-in individual(s). Hence, generic billboards may be presented in the non-logged in environment; and once logged in, customized messaging/billboards may be provided to the client. Further, the format of the billboard advertisement may take a variety of forms (e.g., FLASH™, images, sound, video, etc.).

To display such billboard advertisements, a user on a client computer 104 may access the Internet and a website hosted/delivered by server computer 106. Once accessing the website, a web page may be displayed that allows the user to select or browse a catalog of media content available from a media content provider. As part of such a website, a portion of the web page may provide for the scrolling/sliding onto the screen of billboard advertisements.

Figure 2:
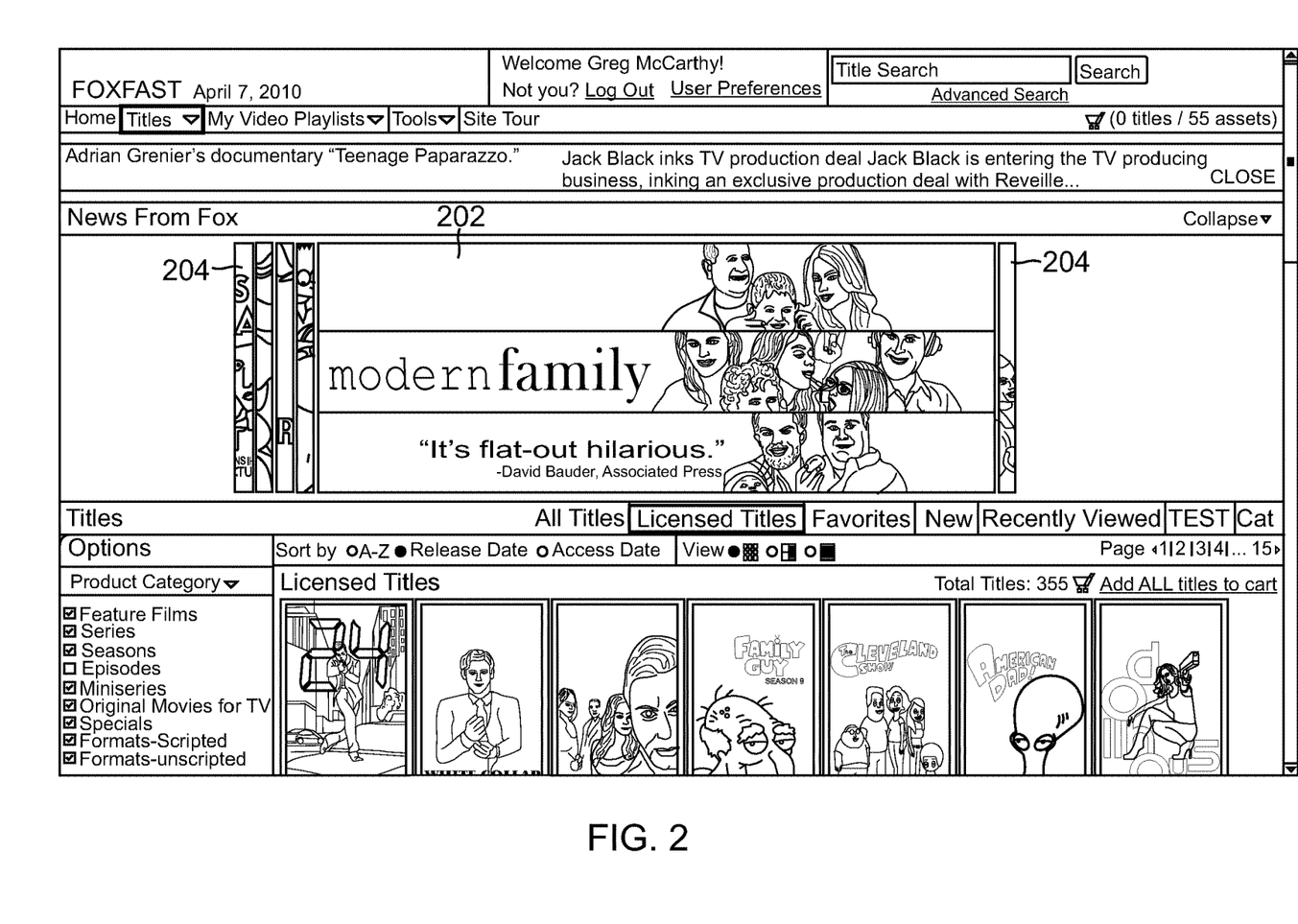
FIG. 2 illustrates a screen shot of such a billboard advertisement provided in accordance with one or more embodiments of the invention.

FIG. 2 illustrates a screen shot of such a billboard advertisement provided in accordance with one or more embodiments of the invention. The current billboard in focus 202 is displayed in the center of the billboard advertisement area. Alternative billboard advertisements 204 may be wholly or partially occluded from view by the billboard in focus 202 such that only a portion or edge of such occluded/covered/obscured billboard advertisements 204 may be displayed/viewed at any given time. As used herein, the term "occluded" means hidden from view, obscured from view, or covered. The billboard in focus 202 may transition to an occluded billboard advertisement 204 by a variety of mechanisms. For example, users may select an edge of an occluded billboard advertisement 204 wherein such a selection will cause the full non-occluded billboard corresponding to the selected edge to scroll/slide onto the screen and become the current billboard in focus 202. Alternatively, rather than a selection that invokes the transition, the transition may be automated or customized as described in further detail below. It may also be noted that any type of transition from partial or occluded view 204 to full in-focus view 202 may be utilized (e.g., a fade, dissolve, checkerboard, or any type of transition available in the prior art such as in a slide presentation application).

One may also note that the billboards 202-204 and format of such advertisements 202-204 may be customized in a plethora of manners. In this regard, the particular display of FIG. 2, wherein six billboards 202-204 are displayed/partially displayed, may be enabled for a particular user when the user logs into a secure area of a website. In this regard, the billboard advertisements 202-204 may represent only those titles that the particular user has licensed from the media content provider. Thus, the billboard in focus 202 presents the title "Modern Family" which the user has currently licensed from the media content provider. Further, different numbers of billboards advertisements 202-204 may also be displayed.

Figure 3:
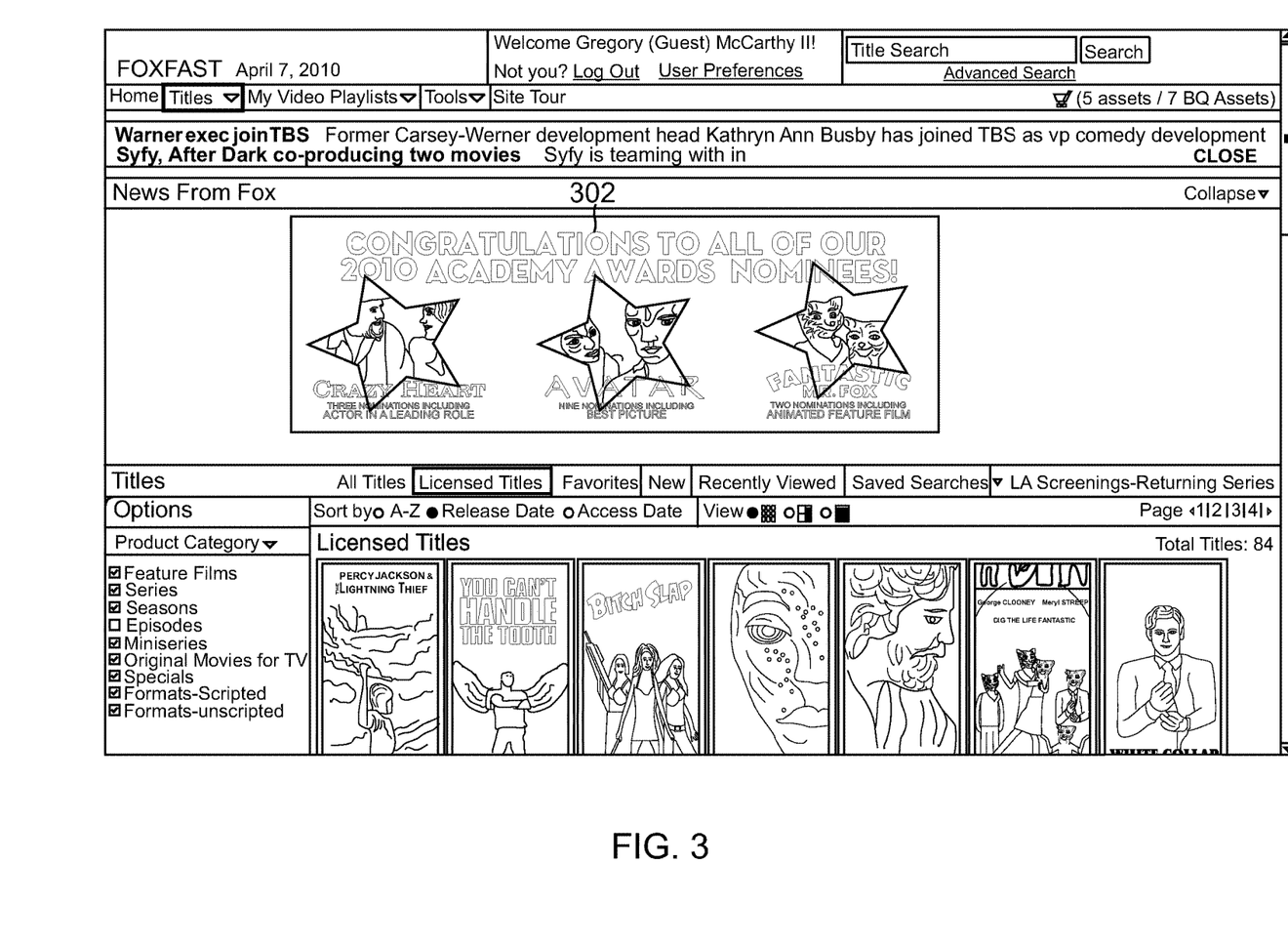
FIG. 3 illustrates a single billboard 302 that a different user has licensed rights to in accordance with one or more embodiments of the invention.

Different users, upon login, may be presented with a different set of billboards. FIG. 3 illustrates a single billboard 302 that a different user has licensed rights to. Accordingly, since the user has only licensed particular titles, billboard advertisements 204 for other non-licensed titles may not be displayed in a completely occluded, partially-occluded, or non-occluded manner. Billboards can be displayed for a client's licensed titles but non-licensed titles may appear as well. Note that other reasons may exist for the lack of display of billboards to a particular user. For example, billboard advertisements may not have been created for other licensed titles for the particular user.

As described above, the billboard advertisements 202-204 and 302 that are displayed to a user are customizable. The customization that is utilized may be established by the customer/user on client computer 104 and/or may be established by a user on the server computer 106 (e.g., the media content owner). Once customized/configured, the billboard that is displayed may be determined based on the user's login. In other words, when a user logs into the website, the server 106 will determine the billboards to display based on the configurations established for the user. Further, the specification of the billboards and any settings/configurations may be specified using extensible markup language (XML), hypertext markup language (HTML), JAVA™, or any other programming or document markup language.

Figure 4:
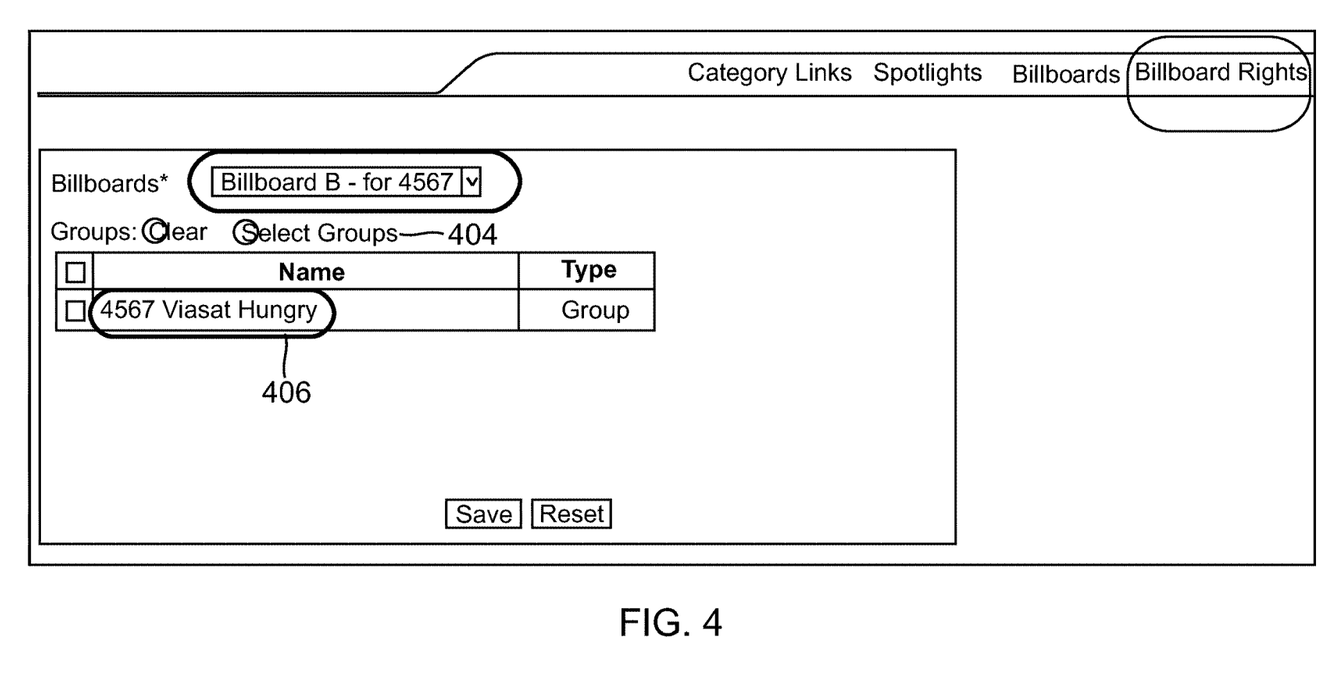
FIG. 4 is a screen shot illustrating the ability to assign access to a particular billboard advertisement based on a user group in accordance with one or more embodiments of the invention.

The customization may be multilevel and based on a client/customer, a specific user at a client/customer, and/or to a group (e.g., all people that have licensed a particular show). FIG. 4 is a screen shot illustrating the ability to assign access rights to a particular billboard advertisement based on a user group (i.e., whether a user is authorized or has rights to view a particular billboard). In this regard, an administrator utilizes drop down box 402 to select a particular billboard advertisement (e.g., Billboard B—for 4567). In addition, the user/administrator selects users or groups via the "Select Groups" link 404. Once added, the selected group 406 is displayed in the group selection area. In FIG. 4, users that belong to the "4567 Viasat Hungary" group are granted rights to the billboard "Billboard B—for 4567".

Figure 5:
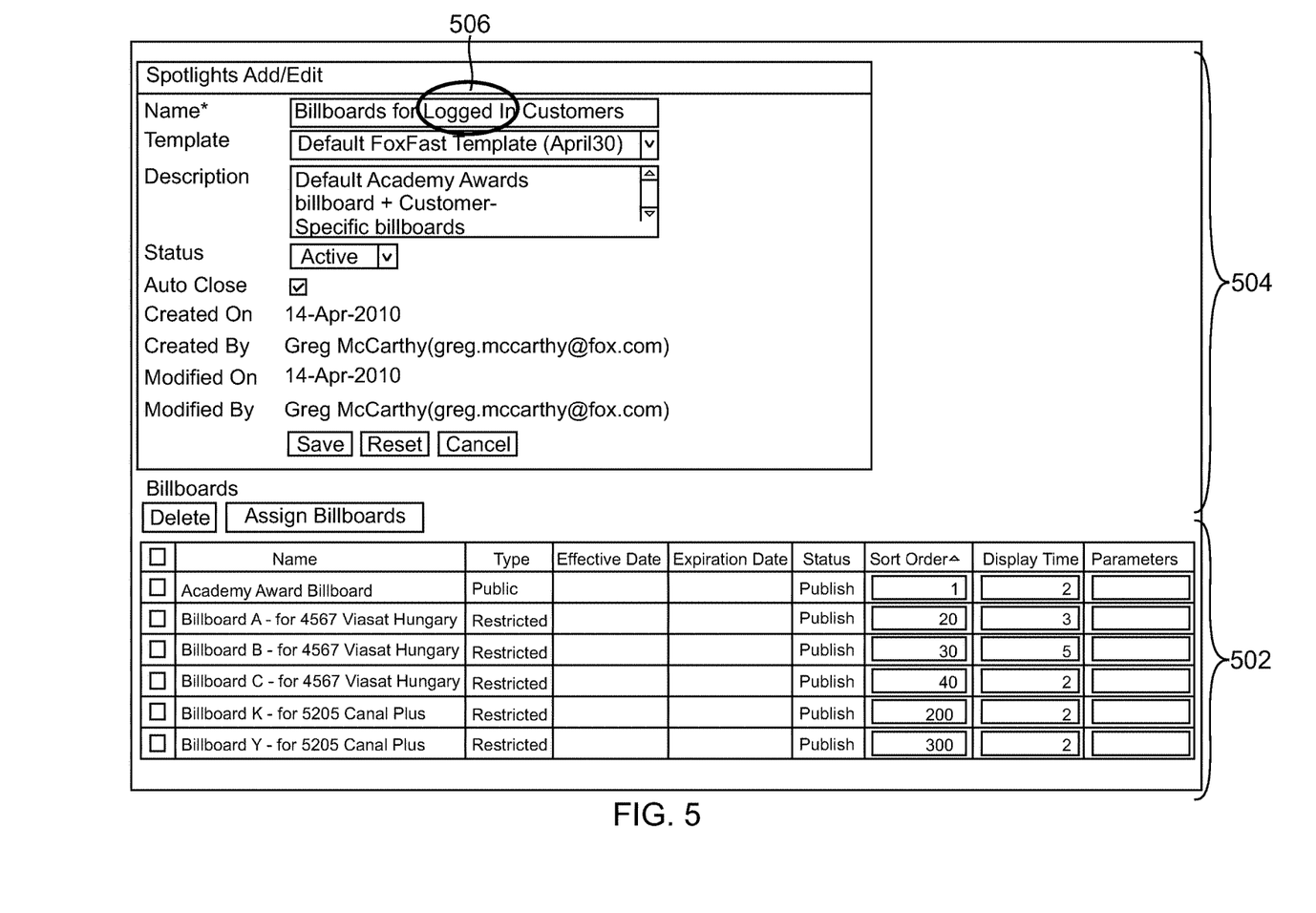
FIG. 5 illustrates a screen shot to define billboard customization settings for a particular client in accordance with one or more embodiments of the invention.

FIG. 5 illustrates a screen shot to define billboard customization settings for particular clients (i.e., to define spotlight ads). As illustrated, the definable settings provide the ability to determine a length of time each billboard is displayed and the sequence in which a billboard advertisement is displayed to the user. In this regard, area 502 identifies each billboard advertisement (i.e., via column "Name" and/or "Type"), the sequence in which it is displayed/sorted (i.e., via column "Sort Order"), and the number of seconds each billboard advertisement is displayed (i.e., via column "Display Time"). Section 504 allows the administrator to assign a name to the defined set of possible billboards that can be displayed, identify the template used to create the settings and/or a textual description, assign either active or inactive status, and find out information regarding the user that created (and most recently modified) the settings. As indicated in the naming convention used 506, the particular billboards to be displayed are for logged in customers. Area 502 indicates that the public "Academy Award Billboard" (e.g., illustrated in FIG. 3) will be displayed first for 2 seconds followed by a series of billboards for the logged in users belonging to the group "4567 Viasat Hungary" or for users belonging to the group "5205 Canal Plus".

Figure 6:
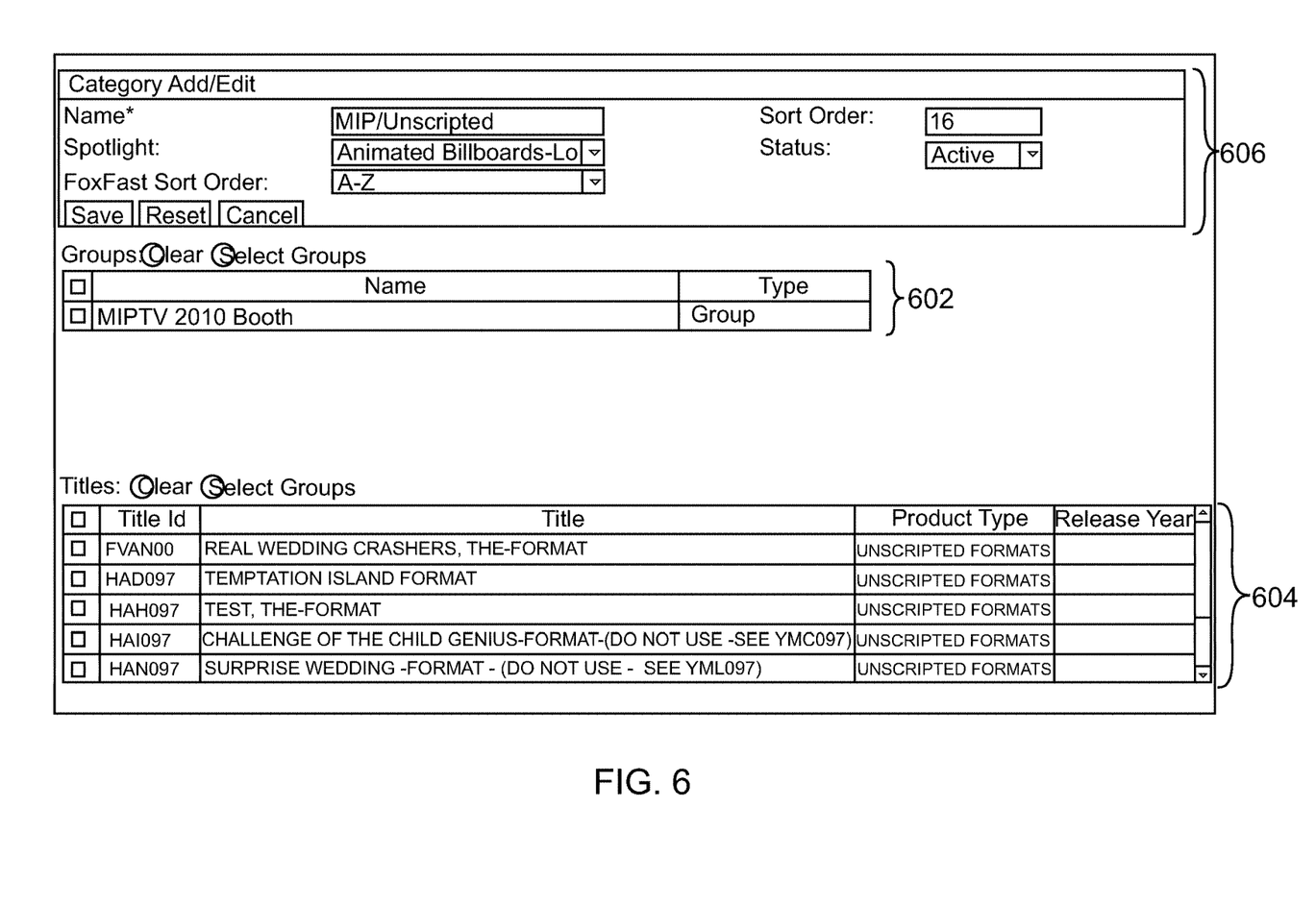
FIG. 6 illustrates a screen shot to define billboard customization settings for a particular user/group of users at a client in accordance with one or more embodiments of the invention.

FIG. 6 illustrates a screen shot to define billboard customization settings for a particular set/category of billboards. The groups assigned to these settings are selected in area 602. Area 604 provides the ability for the administrator to specify the titles of the billboards that should be displayed to the selected groups. In area 606, the administrator can specify a name for the defined group/set of customization settings, a sort order (i.e., "FoxFast Sort Order") for the billboard advertisements that are displayed to the user (e.g., alphabetically A-Z), the sort order within the customization dialog (i.e., the order the titles are displayed in area 604), and whether the defined group of settings are active or inactive.

Figure 7:
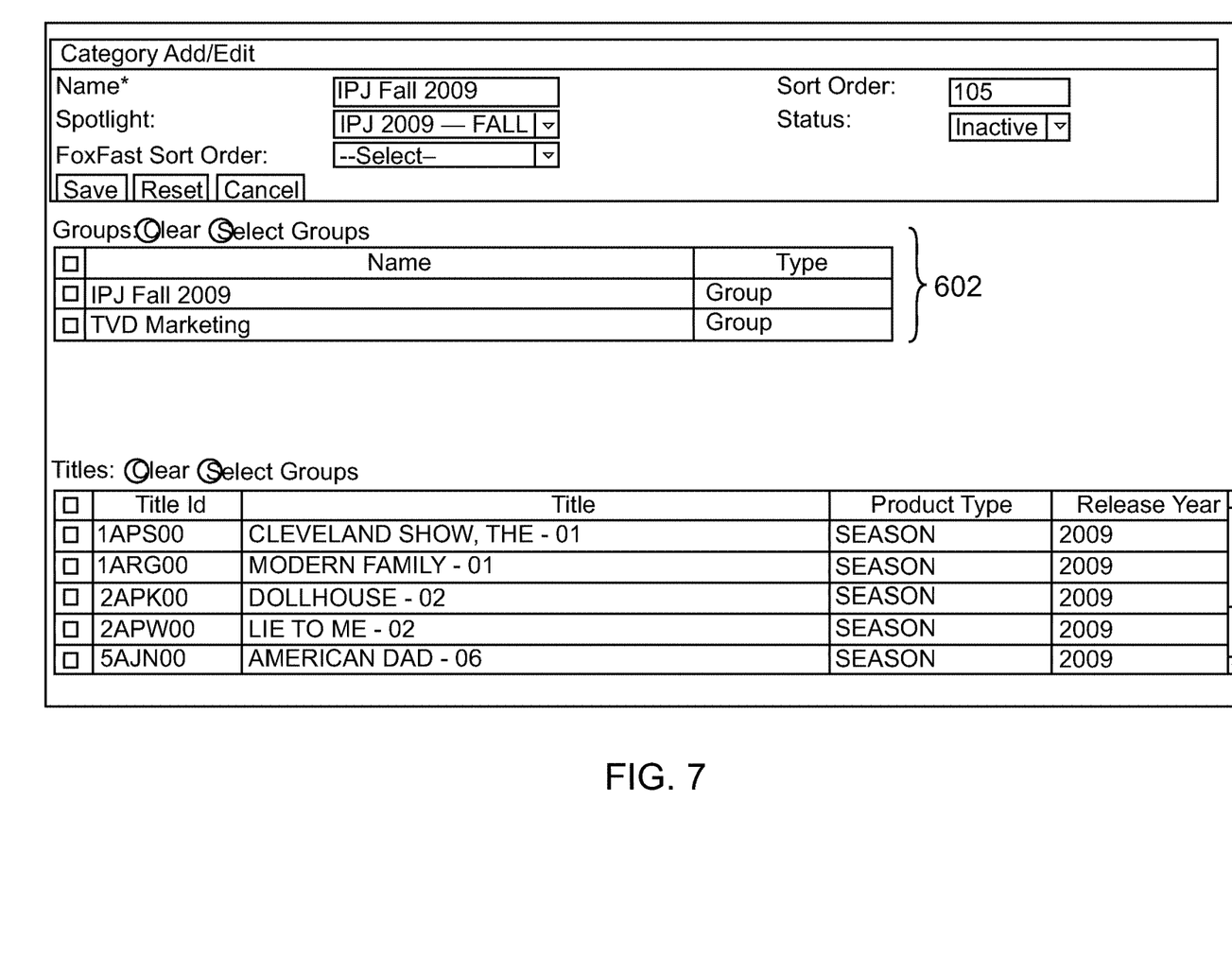
FIG. 7 illustrates a screen shot to define billboard customization settings to all people that have licensed a certain show in accordance with one or more embodiments of the invention.

FIG. 7 illustrates a screen shot to define billboard customization settings to all clients attending a marketing press event know as 'IPJ Fall 2009'. The settings are similar to that of FIG. 6 but have identified a group in area 602 that includes those clients who are members of the "IPJ Fall 2009" group and those who are members of the "TVD Marketing" group.

In addition to the above, it may be noted that an administrator may specify priority for which settings should be used if a conflict arises. For example, customization attributes specified for a particular client may have a higher priority than rules assigned to a group of which the user is a member. In this regard, more specific individual rules may have higher priority than general rules. Such prioritization between different defined groups of settings may be predefined or may be specified by an administrator/user of the system. For example, if two different categories (e.g., the categories defined in FIG. 6 and FIG. 7) both identify the same group in area 602, a prioritization may be used to determine which category/group of titles should be shown to the selected group.

Further, the billboard advertisements may provide the ability to invoke two-way communication between the user and any third party specified. For example, a user may click on a banner to activate a survey to one or more general or specific persons. In yet another embodiment, upon user activation, additional content (e.g., an image, a word document, a portable document format [PDF] document, audio, video, email communication, etc.) may be delivered and/or displayed to the user.

Figure 8A:
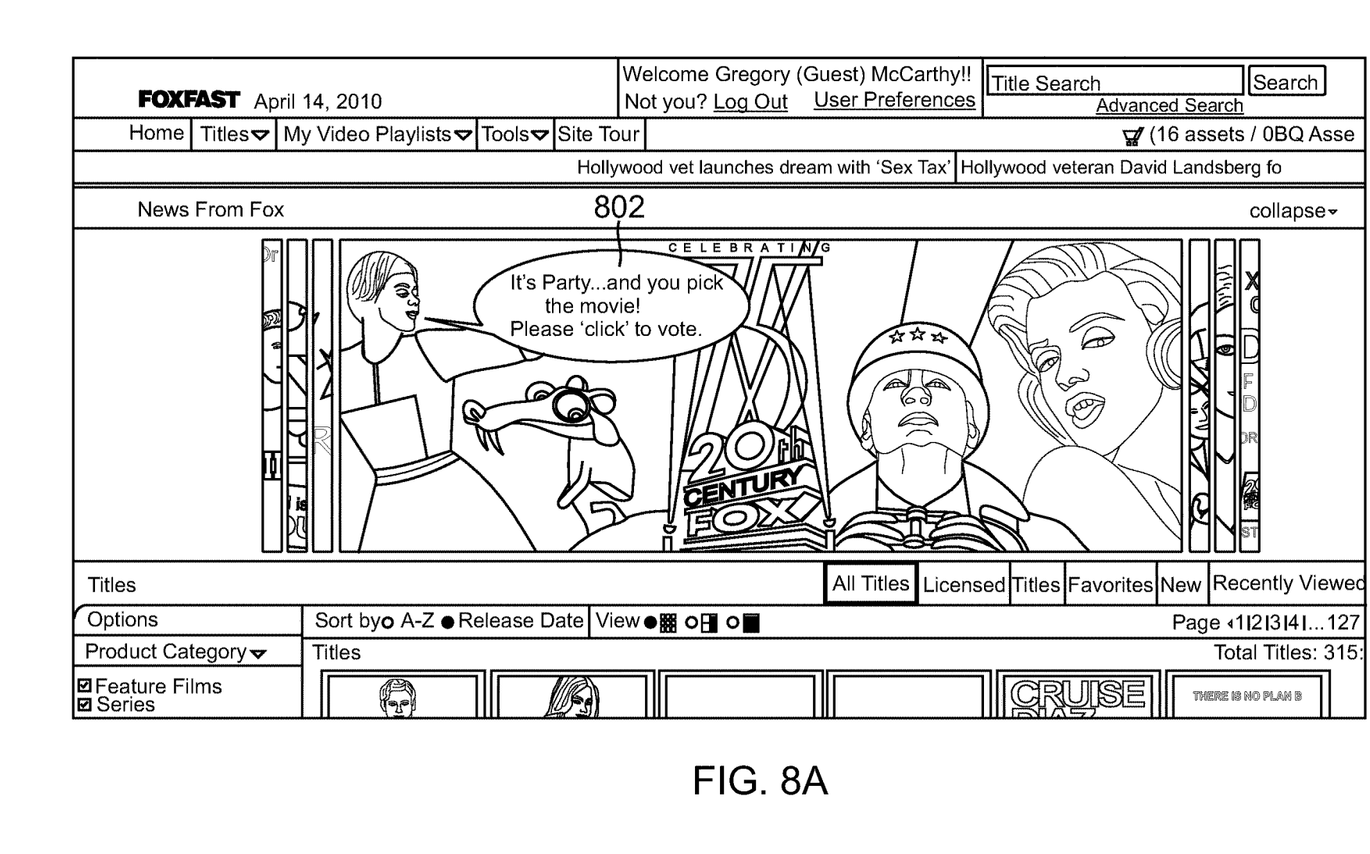
FIGS. 8A and 8B illustrate exemplary screen shots for two way communication invoked via the customized billboard advertisements in accordance with one or more embodiments of the invention.
Figure 8B:
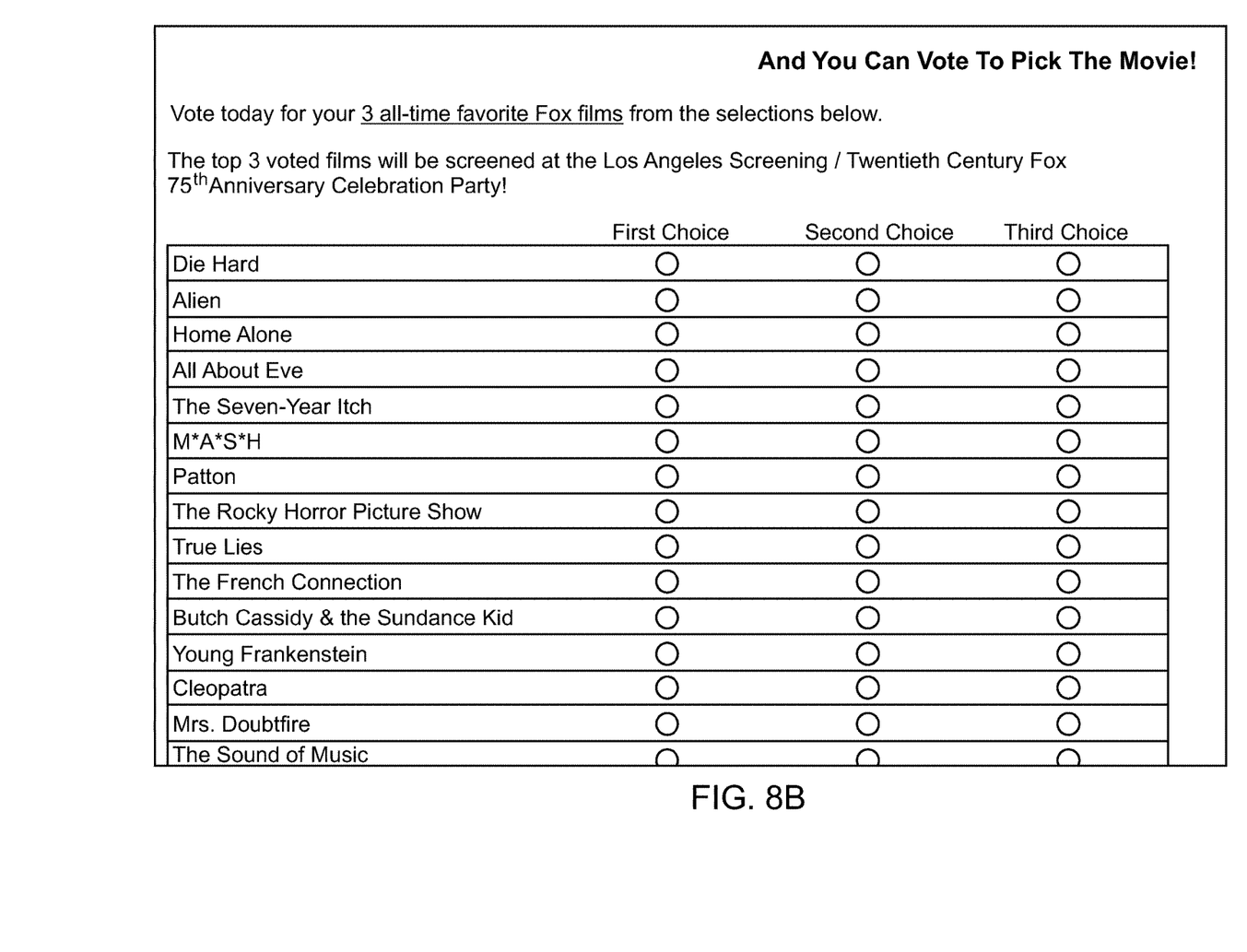

FIGS. 8A and 8B illustrate exemplary screen shots for two-way communication invoked via the customized billboard advertisements. In FIG. 8A, a billboard advertisement is displayed, and the user clicks in the selectable area 802 of the billboard. In response, a new pop-up window or dialog box may be displayed to the user as illustrated in FIG. 8B. In FIGS. 8A and 8B, the two-way communication illustrates the delivery/display of a survey document that is presented to the user to obtain further input/interaction from the user. More advanced or different types of two-way communication (regardless of whether described herein) are within the scope of the present invention. For example, activating the particular billboard may invoke a voice over IP (internet protocol) communication mechanism with the content owner's sales person, an email, a text based document, an application/game, a photograph, an image, an extensible markup language (XML) document, a portable document format (PDF) document, etc.

Thus, different interaction/two-way communication may be enabled by clicking on a particular area of a billboard advertisement (e.g., selectable area 802 or other default background area of the billboard advertisement). The interaction can vary from requesting user input in a survey, invoking an email application, etc.

Logical Flow

Figure 9:
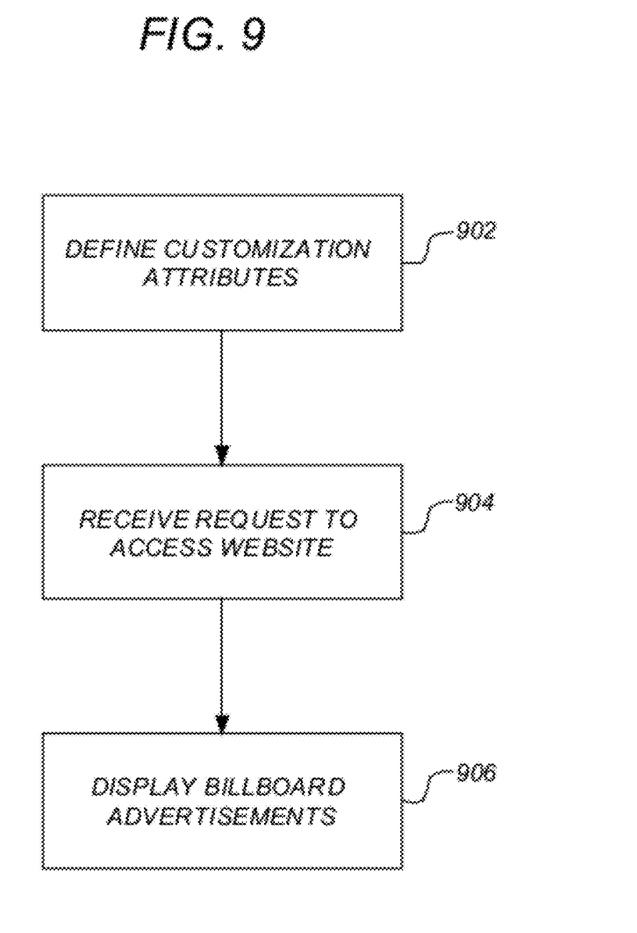
FIG. 9 is a flowchart illustrating the logic for delivering an advertisement in accordance with one or more embodiments of the invention.

FIG. 9 is a flowchart illustrating the logic for delivering an advertisement in accordance with one or more embodiments of the invention.

At step 902, customization attributes are defined for displaying billboard advertisements. Each billboard advertisement is an advertisement for media content and may comprise any combination of text, graphics, and/or video that advertises media content. The shape and structure of the billboard advertisement may vary but is traditionally a rectangular advertisement.

At step 904, a user on a client computer requests access to a website hosted by a server computer. Such access may include a secure hypertext transfer protocol (HTTPS) request that requires a login/password, or may be a publicly accessible website.

At step 906, the server computer transmits the webpage (e.g., via HTML, XML, JAVA™, ActiveX™ controls, Flash™, etc.) that contains the one or more billboard advertisements (or contains instructions that causes the display of the one or more billboard advertisements). A first advertisement is primarily displayed without occlusion (e.g., the primary advertisement is in-focus and is either not occluded or is only barely occluded by the remaining billboard advertisements. The remaining advertisements are partially occluded by the first advertisement. In one or more embodiments, such partial occlusion provides that an edge of each advertisement is displayed adjacent to the first advertisement. In such embodiments, parts other than an edge may be displayed but the primary display includes a single billboard advertisement while other advertisements may be scrolled off-screen, displayed transparently, or displayed in a manner that they can be partially viewed for selection by the user. In addition, each of the billboard advertisements is displayed based on the defined customization attributes. Alternatively, "full-bleed billboards" may be provided where navigation to other of these types of billboards may be conducted via directional arrows or similar means.

Step 906 may further include the display of a second advertisement which causes the second advertisement to become "in-focus" or displayed in a non-occluded manner while the first advertisement is then partially occluded by the second advertisement (e.g., only an edge of the first advertisement is displayed). The transition of the display from the first to the second advertisement may be by scrolling or sliding of the second advertisement over the first advertisement.

The display of the advertisements is consistent with the customization attributes. Accordingly, the billboard advertisements may correspond to media content that the user has licensed from a media content owner, may be based on a group that the user is a member of, or based on a group that the user belongs to (e.g., that has licensed a particular show/media asset). In other words, billboard advertisements may be customized to a particular user/client, to a specific user at a client, to all people that have licensed a particular show/media content, etc. Other customization of the billboards based on other properties/attributes may be also be available in accordance with embodiments of the invention.

The display of the advertisements may further cause a rotation or transition to a new billboard at specified time intervals (e.g., each billboard advertisement is "in-focus" or non-occluded for a defined time period without further interaction or requests initiated by the user of the website). In addition, as described above, the user may activate or select a billboard advertisement causing the initialization of a two-way communication where information relating to the selected advertisement is displayed on the user's computer (e.g., via a pop-up window, within the existing site, or via delivery of content such as an email).

Conclusion

This concludes the description of the preferred embodiment of the invention. The following describes some alternative embodiments for accomplishing the present invention. For example, any type of computer, such as a mainframe, minicomputer, or personal computer, or computer configuration, such as a timesharing mainframe, local area network, or standalone personal computer, could be used with the present invention.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A computer implemented method for delivering a website advertisement, comprising:
   (a) displaying, by a server computer, a graphical user interface, wherein the graphical user interface comprises customization attributes;
   (b) accepting, from an administrator of an owner of media content, administrator input into the graphical user interface, wherein the administrator input defines settings for the customization attributes for how one or more billboard advertisements are to be displayed via a web site, wherein:
      (i) the one or more billboard advertisements each comprise an advertisement for media content;
      (ii) the customization attributes define access rights based on a user and/or a categorical group of users for display of the one or more billboard advertisements;
      (iii) the media content advertised in the advertisement and the advertisement are owned and provided by the owner via the website; and
      (iv) the user is a customer of the owner;
   (c) receiving, by the server computer, a request from the user on a client computer to access the website;
   (d) enabling two-way communications between the user on the client computer and the owner on the server computer, by, in response to the request and based on the access rights, transmitting, by the server computer to the client computer, processing instructions that cause the client computer to display, on a display device, a first billboard advertisement of the one or more billboard advertisements, wherein:
      (i) the first billboard advertisement is primarily displayed without occlusion;

(ii) remaining billboard advertisements of the one or more billboard advertisements are displayed partially occluded by the first billboard advertisement;

(iii) the one or more billboard advertisements are displayed based on the customization attributes; and (iv) the customization attributes provide that one or more billboard advertisements that are displayed correspond to media content that the user has licensed from the owner of the media content; and (e) transmitting, from the server computer to the client computer, instructions causing the client computer to transition from the first billboard advertisement to a second billboard advertisement of the remaining billboard advertisements by displaying the second billboard advertisement primarily without occlusion, wherein the displaying of the second billboard advertisement causes the first billboard advertisement to be displayed partially occluded by the second billboard advertisement.

2. The computer implemented method of claim 1, wherein the second billboard advertisement scrolls or slides across a display area to cause the partial occlusion of the first billboard advertisement.

3. The computer implemented method of claim 1, wherein the customization attributes provide that one or more billboard advertisements that are displayed are based on a group that the user is a member of.

4. The computer implemented method of claim 3, wherein the one or more billboard advertisements correspond to one or more groups the user belongs to.

5. The computer implemented method of claim 1, wherein the customization attributes provide that one or more billboard advertisements are each displayed for a defined time period.

6. The computer implemented method of claim 1, further comprising:

receiving a communication, from the client computer to the server computer, indicating an activation of the first billboard advertisement; and in response to such communication, transmitting, from the server computer to the client computer, processing instructions that cause the client computer to display additional information relating to the first billboard advertisement.

7. A system for delivering an advertisement comprising:
(a) a server computer having a memory;
(b) a communication mechanism on the server computer configured to enable communication with a client computer across a computer network; and
(c) an application executing on the server computer, wherein the application is configured to (i) display, on a display device, a graphical user interface, wherein the graphical user interface comprises customization attributes;

(ii) accept, from an administrator of an owner of media content, administrator input into the graphical user interface, wherein the administrator input defines settings for the customization attributes for displaying one or more billboard advertisements on the client computer via a web site, wherein:

(1) the one or more billboard advertisements each comprise an advertisement for media content; and (2) the customization attributes define access rights based on a user and/or a categorical group of users for display of the one or more billboard advertisements;

(3) the media content advertised in the advertisement and the advertisement are owned and provided by the owner via the website; and (4) the user is a customer of the owner;

(ii) receive a request from the user on the client computer to access the website hosted by the server computer;

(iii) enable two-way communications between the user on the client computer and the owner on the server computer, by, in response to the request and based on the access rights, transmit, from the server computer to the client computer, using the communication mechanism, processing instructions that cause the client computer to display a first billboard advertisement of the one or more billboard advertisements, wherein:

(1) the first billboard advertisement is primarily displayed without occlusion;

(2) remaining billboard advertisements of the one or more billboard advertisements are displayed partially occluded by the first billboard advertisement;

(3) the one or more billboard advertisements are displayed based on the customization attributes; and (4) the customization attributes provide that one or more billboard advertisements that are displayed correspond to media content that the user has licensed from the owner of the media content; and (iv) transmit, from the server computer to the client computer, instructions causing the client computer to transition from the first billboard advertisement to a second billboard advertisement of the remaining billboard advertisements by displaying the second billboard advertisement primarily without occlusion, wherein the displaying of the second billboard advertisement causes the first billboard advertisement to be displayed partially occluded by the second billboard advertisement.

8. The system of claim 7, wherein the second billboard advertisement scrolls or slides across a display area to cause the partial occlusion of the first billboard advertisement.

9. The system of claim 7, wherein the customization attributes provide that one or more billboard advertisements that are displayed are based on a group that the user is a member of.

10. The system of claim 9, wherein the one or more billboard advertisements correspond to one or more groups the user belongs to.

11. The system of claim 7, wherein the customization attributes provide that one or more billboard advertisements are each displayed for a defined time period.

12. The system of claim 7, wherein the application is further configured to:

receive a communication indicating an activation of the first billboard advertisement on the client computer; and in response to such communication, transmit, from the server computer to the client computer, processing instructions that cause the client computer to display additional information relating to the first billboard advertisement.

13. A non-transitory computer readable storage medium encoded with computer program instructions which when accessed by a computer cause the computer to load the program instructions to a memory therein creating a special purpose data structure causing the computer to operate as a specially programmed server computer, executing a method of delivering an advertisement, comprising:
  (a) displaying, in the specially programmed server computer, a graphical user interface, wherein the graphical user interface comprises customization attributes;
  (b) accepting, in the specially programmed server computer, from an administrator of an owner of media content, administrator input into the graphical user interface, wherein the administrator input defines settings for the customization attributes for displaying one or more billboard advertisements via a website, wherein:
    (i) the one or more billboard advertisements each comprise an advertisement for media content; and
    (ii) the customization attributes define access rights based on a user and/or a categorical group of users for display of the one or more billboard advertisements;
    (iii) the media content advertised in the advertisement and the advertisement are owned and provided by the owner via the website; and
    (iv) the user is a customer of the owner;
  (c) receiving, in the specially programmed server computer, a request from a user on a client computer to access the website;
  (d) enabling two-way communications between the user on the client computer and the owner on the server computer, by, in response to the request and based on the access rights, transmitting, from the specially programmed server computer to the client computer, processing instructions that cause the client computer to display a first billboard advertisement of the one or more billboard advertisements, wherein:
    (i) the first billboard advertisement is primarily displayed without occlusion;
    (ii) remaining billboard advertisements of the one or more billboard advertisements are displayed partially occluded by the first billboard advertisement;
    (iii) the one or more billboard advertisements are displayed based on the customization attributes; and
    (iv) the customization attributes provide that one or more billboard advertisements that are displayed correspond to media content that the user has licensed from the owner of the media content; and
  (e) transmitting, from the server computer to the client computer, instructions causing the client computer to transition from the first billboard advertisement to a second billboard advertisement of the remaining billboard advertisements by displaying the second billboard advertisement primarily without occlusion, wherein the displaying of the second billboard advertisement causes the first billboard advertisement to be displayed partially occluded by the second billboard advertisement.

14. The non-transitory computer readable storage medium of claim 13, wherein the second billboard advertisement scrolls or slides across a display area to cause the partial occlusion of the first billboard advertisement.

15. The non-transitory computer readable storage medium of claim 13, wherein the customization attributes provide that one or more billboard advertisements that are displayed are based on a group that the user is a member of.

16. The non-transitory computer readable storage medium of claim 15, wherein the one or more billboard advertisements correspond to one or more groups the user belongs to.

17. The non-transitory computer readable storage medium of claim 13, wherein the customization attributes provide that one or more billboard advertisements are each displayed for a defined time period.

18. The non-transitory computer readable storage medium of claim 13, further comprising:
  receiving a communication, from the client computer to the specially programmed server computer, indicating an activation of the first billboard advertisement; and
  in response to such communication, transmitting, from the specially programmed server computer to the client computer, processing instructions that cause the client computer to display additional information relating to the first billboard advertisement.

19. The computer implemented method of claim 1 wherein a visible portion, of each of the remaining billboard advertisements that is not occluded by the first billboard advertisement, comprises graphic content that is part of respective advertisements in each remaining billboard advertisement.

20. The system of claim 7 wherein a visible portion, of each of the remaining billboard advertisements that is not occluded by the first billboard advertisement, comprises graphic content that is part of respective advertisements in each remaining billboard advertisement.

21. The non-transitory computer readable storage medium of claim 13 wherein a visible portion, of each of the remaining billboard advertisements that is not occluded by the first billboard advertisement, comprises graphic content that is part of respective advertisements in each remaining billboard advertisement.

22. The computer implemented method of claim 1 further comprising:
  specifying a priority for which of the settings to use when a conflict between settings arises.

23. The computer implemented method of claim 22 wherein the priority comprises:
  settings for the user are higher priority than settings for a categorical group of users that the user is a member of.

24. The system of claim 7 wherein the application is further configured to:
  specify a priority for which of the settings to use when a conflict between settings arises.

25. The system of claim 24 wherein the priority comprises:
  settings for the user are higher priority than settings for a categorical group of users that the user is a member of.

26. The non-transitory computer readable storage medium of claim 13 wherein the method further comprises:
  specifying, in the specially programmed server computer, a priority for which of the settings to use when a conflict between settings arises.

27. The non-transitory computer readable storage medium of claim 26 wherein the priority comprises:
  settings for the user are higher priority than settings for a categorical group of users that the user is a member of.

* * * * *